July 10, 1923.
W. H. SCHULZE
TRANSMISSION DRIVE FOR SPEEDOMETERS
Filed Aug. 14, 1922
1,461,293
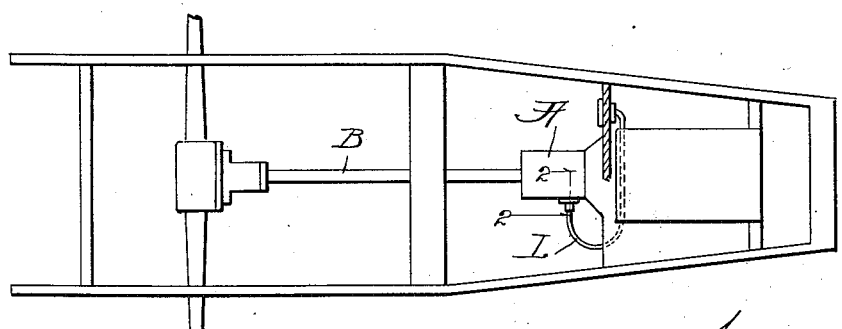
Fig. 1.
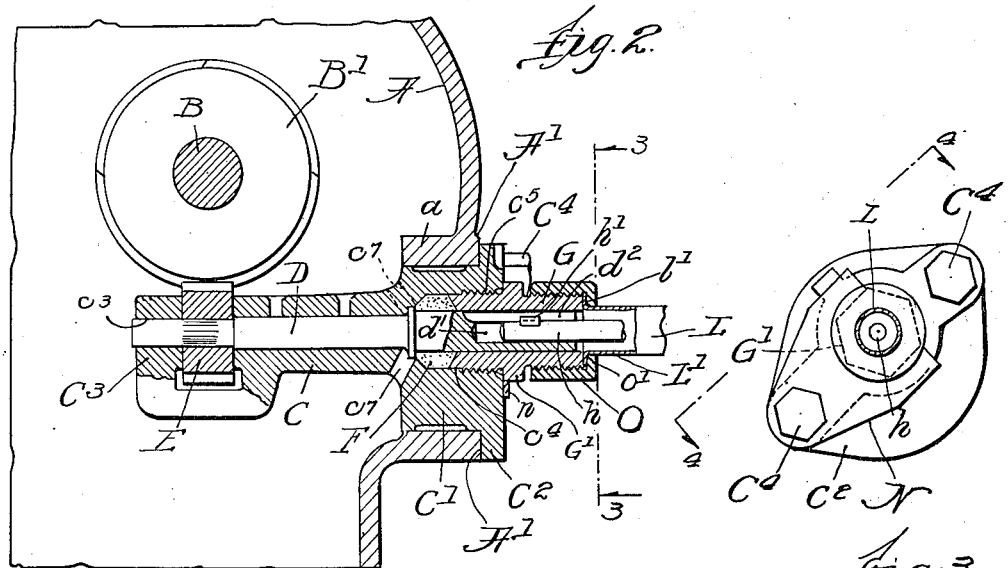
Fig. 2.
Fig. 3.
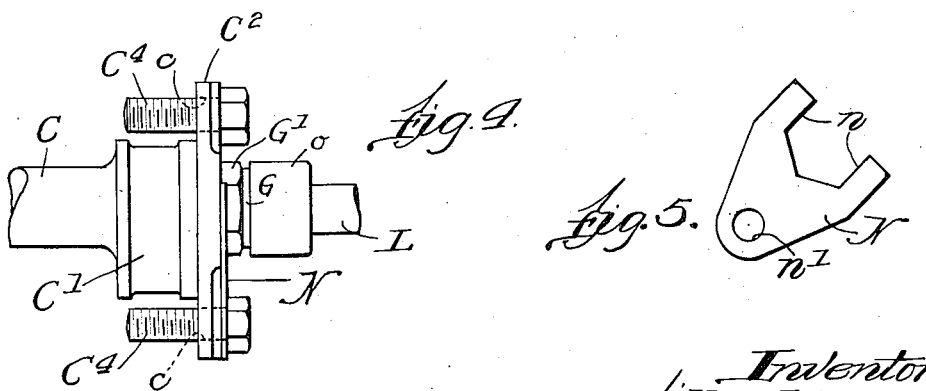
Fig. 4.
Fig. 5.
Inventor:
William H. Schulze,
by Burton & Burton
his Attys.
Witness:

Patented July 10, 1923.

1,461,293

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

TRANSMISSION DRIVE FOR SPEEDOMETERS.

Application filed August 14, 1922. Serial No. 581,690.

*To all whom it may concern:*

Be it known that I, WILLIAM H. SCHULZE, a citizen of the United States, residing in the city of Chicago, in the county of Cook and the State of Illinois, have invented certain new and useful Improvements in Transmission Drives for Speedometers, of which the following is a specification, reference being had to the accompanying drawings, forming a part thereof.

The purpose of this invention is to provide an improved construction in connection with the transmission casing of an automobile, for connecting to the operating mechanism thereof, a flexible shaft for driving a speedometer or the like, carried by the vehicle. It consists in the elements and features of construction shown and described, as indicated in the claims.

In the drawings:

Figure 1 is a partly diagrammatic plan view of a portion of the chassis and operating mechanism of a motor vehicle equipped with this invention.

Figure 2 is a vertical section at the line 2—2 on Figure 1, being axial with respect to the shaft provided in the transmission casing for connection with and driving a flexible shaft for the speedometer.

Figure 3 is a detail side elevation of the parts shown in Figure 2 in the direction of the arrows 3, on Figure 2.

Figure 4 is a detail plan view of the parts shown in Figure 3.

Figure 5 is a perspective view of a nut-locking device for preventing the fitting embodying the invention from becoming unscrewed from the transmission casing.

In the structure shown in the drawings, the transmission casing of the motor mechanism of the vehicle is shown at A. B is a fore-and-aft extending power shaft journaled in said casing which for the purpose of this invention is provided with a power-transmitting gear wheel $B^1$, which in the form illustrated in the drawings is a spiral gear. The transmission casing, A, has in its lateral wall a boss $a$, which is apertured in the plane of the gear $B^1$, the aperture being situated with respect to gear so that a tangent to the pitch line of the gear may extend out through said aperture parallel to the interior circumscribing wall thereof. C is a tubular member adapted to be inserted through the aperture $a$, and diametered at a portion $C^1$ of its length for fitting in said aperture, and at the outer limit of said fitted portion provided with a flange $C^2$, for seating on the outer end of the boss $a$, said flange being extended in one diametric direction to receive bolt holes $c$, through which bolts $C^4$ are applied for securing the tubular member C to the transmission casing. This tubular member C is provided with an inner journal bearing for an out-leading shaft D, and for that purpose has at its inner end a bracket extension $C^3$, which terminates in a bearing $c^3$, which is spaced off from the remainder of the tubular member a distance sufficient to accommodate a gear member E, which is fast on the shaft D, journaled in said tubular member for meshing with the gear $B^1$. For providing an outer journal bearing for the shaft D, the tubular member C is counterbored at its outer end as seen at $c^4$, and interiorly threaded in said counterbore, as seen at $c^5$, for receiving a screwed-in journal bearing bushing G. The counterbore affords at its inner end a space for lubricant, and is provided with a lubricant-holding packing F, which is compressed for performing its stuffing box function by the bushing G, which thus serves as a follower for the stuffing box which is constituted by the counterbore, as described. An oil port $c$,—and if desired, a plurality of such ports,—as shown, are formed at the inner end of the enlarged part $C^1$ of the tubular member C, leading into the counterbore thereof from the general cavity of the transmission casing which is supplied with oil as usual; and thereby the packing F is kept supplied with lubricant for lubricating the shaft. The journal bearing bushing G has intermediate its ends, a flange $G^1$, adapting it to be screwed up tight against the end of the tubular member to form a closure for the said flange, being non-circular and, as shown, preferably hexagonal to afford means for thus screwing in the bushing. The shaft D is axially bored at its outer end, as seen at $d^1$, $d^1$, and is slotted at one side of said bore as seen at $d^2$, $d^2$, for sliding engagement of the terminal link member $h$, of the flexible shaft for connection with which the device is provided, said shaft member having a pressed-out feather, $h^1$, for engaging the slot $d^2$, whereby the flexible shaft rotary member $h$ is driven from the shaft, D. The flexible casing L of the flexible shaft is terminated by a ferrule $L^1$, which encloses and is soldered to said flexible casing, and is provided with a terminal flange, $l^1$, which lodges at the outer end of the journal bearing bushing, G, and is engaged by the inturned flange $o^1$ of the coupling O, which is screwed onto the exteriorly threaded end of the bushing for coupling the flexible shaft casing thereto, when the rotary member $h$ of the flexible shaft is engaged as described with the shaft D. N is a nut-locking device having at one end a forked notch $n$, which engages the hexagonal flange $G^1$, and has a bolt hole $n^1$ adapting it to be secured by one of the bolts $C^4$, which holds the member C to the transmission casing, thus securing the bushing G against becoming unscrewed from the member C.

Upon consideration of the structure as described, it will be seen that the member G may have coupled to it by the turret $N^1$, the flexible shaft casing L, and the shaft D, journaled in the tubular member being coupled as shown, to the rotary element H, of the flexible shaft, the assemblage may be brought into conjunction with the transmission casing by the insertion of the tubular member through the aperture $a$, and the application of the securing bolts for holding the locking device N in locking position at the same time that the tubular member C is secured to the casing; and that the journal bearing bushing G is at the same time locked against unscrewing from said tubular member by the engagement of its hexagonal flange $G^1$, with the correspondingly shaped aperture in the locking member N, from which the turret $N^1$ extends.

It will be seen also that the rotary element H of the flexible shaft L is at all times provided with lubricant through the apertures $c^7$, leading from the lubricant-containing space of the transmission casing. Also it will be observed that the slots $d^2$, leading from the axial bore $d^1$ of the shaft, afford access to the journal bearing of the shaft for lubricant which may, and will to some extent, escape from the flexible shaft casing, which, it will be understood is as usual, charged with lubricant for lubricating the flexible shaft. Also lubricant will enter the slot $c^7$, derived from the lubricant-holding packing F, as the latter is compressed in screwing in the journal bearing bushing G, and thus from both sources the shaft D is assured of adequate lubrication. It will be noticed that in view of the fact that the gear E, for meshing with the gear $B^1$, is carried at the unsupported end of the tubular member C, it is essential that said tubular member should be very rigidly and securely held in the casing without liability to deflection from its true axial position, and for this purpose the elongation of the boss $A^1$, corresponding to the elongation of the larger diametered portion $C^1$ of the tubular member C, is designed as shown, and the flange $C^2$ is fitted to seat accurately upon the outer end of the boss $A^1$, and rigidly bound thereto.

I claim:

1. In combination with a transmission casing and a power shaft therein having a gear for delivery of power from said shaft, the casing having an apertured boss through which a tangent to the pitch line of said gear may extend parallel to the circumscribing wall of the aperture, a tubular member exteriorly diametered over part of its length to fit said aperture, and flanged at the outer limit of said part for seating of said flange against the wall of the casing at the outer end of the boss, and having at each end a shaft bearing, the bearing at the inner end being spaced longitudinally from the remainder of the tubular member; a shaft journaled in both said bearings extending across said space and a gear on said shaft located in said space, whereby the gear stops the shaft longitudinally in said tubular member.

2. In the construction defined in claim 1, foregoing, the outer end of the tubular member being counterbored and interiorly screw threaded, and an outer-end bearing for said shaft consisting of a bushing screwed into said counterbore and exteriorly screw-threaded for coupling to the casing of a flexible shaft and the like.

3. In the construction defined in claim 1, foregoing, the outer end of the tubular member being counterbored and interiorly screw-threaded; a bearing bushing for the shaft screwed into the counterbore and having a non-circular flange for engagement in the screwing in the bushing, and for stopping it at the limit; a locking device consisting of a plate apertured to engage the non-circular flange and for engagement by one of the bolts which secure the flange of the tubular member to the casing.

4. In the construction defined in claim 1, foregoing, the outer end of the tubular member being counterbored as stuffing box for the shaft, interiorly screw-threaded at said counterbore, and a combined bearing-bushing and stuffing-box-closure screwed into said threaded counterbore.

5. In the construction defined in claim 1, foregoing, the tubular member having an oil inlet aperture leading into the shaft-bearing at a point farther inward from the inner face of the flange than the axial length of the casing boss, for admitting oil from the casing to the shaft bearing in said tubular member, the outer end of the latter being counterbored, to said oil inlet to form a stuffing box for holding a lubricant-absorbent, and a stuffing box closure adapted to serve as a bearing for the shaft screwed into said counterbore.

6. In the construction defined in claim 1, foregoing, in combination with the transmission having a boss exteriorly surfaced to a flat seat and axially apertured, the tubular member diametered at part of its length to fit the boss aperture, flanged to seat on the flat seat; and counterbored and interiorly threaded at said fitted part for receiving a journal bearing bushing, such bushing having a wrench-engaging flange, and a locking device consisting of a plate stamping having an aperture for fitting the wrench-engaging flange of the bushing, and apertured for engagement by one of the bolts which secure the tubular metal flange to the casing.

In testimony whereof, I have hereunto set my hand at Chicago, Illinois, this 9th day of August, 1922.

WILLIAM H. SCHULZE.